Nov. 21, 1967  K. M. HANSEN  3,353,854
STRUCTURAL CORNER ASSEMBLY
Filed April 9, 1965  2 Sheets-Sheet 1

INVENTOR.
KENNETH M. HANSEN
BY Robert F. Casey
ATTORNEY

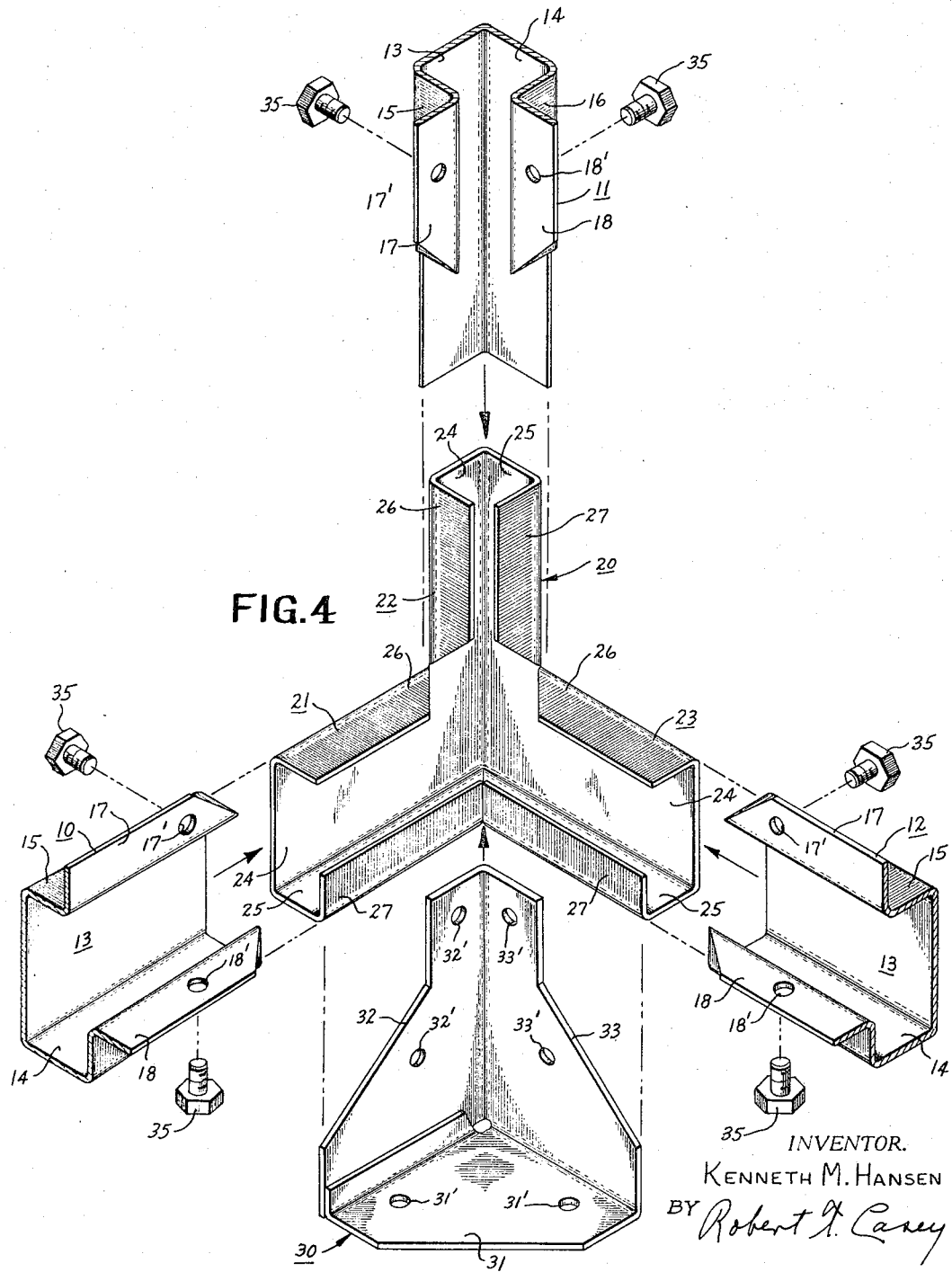

United States Patent Office 3,353,854
Patented Nov. 21, 1967

3,353,854
STRUCTURAL CORNER ASSEMBLY
Kenneth M. Hansen, New York, N.Y., assignor to General
Electric Company, a corporation of New York
Filed Apr. 9, 1965, Ser. No. 447,018
5 Claims. (Cl. 287—189.36)

My invention relates to structural framework assemblies, and more particularly to a corner assembly for connecting two or more elongated framework members.

Framework assemblies for supporting substantial weight, such for example as in electrical switchboard constructions, are commonly constructed of elongated framework members or struts of metal connected at various points to form corners. In particular, three such elongated structural members are often connected in mutually perpendicular relation to form a "tripod" or three-member corner. In order to provide a rigid assembly, such members are often welded together. While welding produces a satisfactory joint, such welding must be done before the structural members are painted thus making it impossible to stock finished members ready for assembly. In addition, welding requires the use of jigs or fixtures for maintaining the parts in proper alignment during the welding operation, and also requires certain finishing or cleaning operations following welding.

An equally common method of assembly is to partially overlap the structural members and fasten them together by suitable fastening means such as bolting or riveting. Prior art bolted or riveted structures, however, in order to provide a sufficiently rigid joint, require extreme accuracy in construction of the parts and drilling of holes, with corresponding increase in expense of manufacture and time required for the assembly. In addition, prior art bolted or riveted joints are commonly subject to loosening by vibration, and often comprise a weak point in the structure.

It is an object of the present invention to provide a structural joint assembly of the type using fastening means such as bolts or rivets which does not require extreme accuracy in the construction of the parts.

It is another object of the invention to provide a structural corner assembly which includes an inherent resiliency such that it is not subject to loosening by vibration.

It is another object of the invention to provide a bolted or riveted joint assembly which provides a reinforced joint structure such as to add to, rather than detract from, the strength of the structural assembly.

It is another object of the invention to provide a structural corner assembly comprising pre-formed parts which can be stocked in finished form and readily assembled without the necessity of metal working such as drilling, bending, etc., and without the necessity of finishing operations such as grinding, smoothing, or painting.

In accordance with the invention, a structural assembly is provided comprising at least two elongated generally channel-shaped structural members or struts having a lengthwise opening flanked by outwardly directed flange portions. A reinforcing member is also provided which is generally corner-shaped, having at least a pair of outwardly-directed arm portions which are also generally channel-shaped. The arms of the reinforcing member are received into corresponding end portions of the elongated structural members. The reinforcing member is furthermore dimensioned such that portions of it project slightly beyond the flange portions of the structural members. A securing plate or gusset is further provided which is also generally corner-shaped and includes portions overlying the edge portions of the channel sides of the reinforcing member in such a manner as to be spaced away from the flanges of the structural members a short distance. The securing plate or gusset is attached to the flange portions of the structural members by suitable securing means such as by bolts or rivets. Because of the aforesaid dimensioning of the reinforcing member, the parts are stressed by the fastening operation to provide an inherent resiliency which keeps the parts securely in engagement with each other, resisting loosening due to vibration, etc. By reason of this construction, the reinforcing member may fit relatively loosely within the structural members prior to installation of the fastening means. In addition, the reinforcing insert acts to provide the required alignment of the parts prior to the fastening operation.

In accordance with the invention in one form, a structure is provided for connecting three elongated structural members in mutually perpendicular relation. In accordance with this form of the invention, the structural members comprise generally rectangular tubular members having a portion left open and flanked by outwardly-directed flange portions. A reinforcing insert is provided in the form of a tripod, of rigid metallic construction having three mutually perpendicular arm portions each of which also comprises a generally rectangular tubular member having a portion left open, but preferably without flange portions. The arm portions of the tripod insert are each received within an end portion of a corresponding one of the structural members to be joined. The reinforcing tripod is dimensioned so that its side portions project through the opening in the structural member slightly beyond the flange portions. A securing plate or gusset is also provided which is generally corner-shaped, comprising three mutually perpendicular triangular planar sections. The securing plate or gusset is positioned so as to close a portion of the openings in the reinforcing tripod arms, and is attached to corresponding flange portions of the structural members by suitable securing means such as by bolts or rivets. Because of the aforementioned difference in dimensions of the reinforcing insert and the structural members, the fastening operation creates inherent resilience of stress in the parts, causing the structural members to be tightly pressed against the reinforcing tripod and providing an extremely rigid construction.

The invention will be more fully understood from the following detailed description, and its scope will be pointed out in the appended claims.

In the drawings:

FIGURE 4 is an exploded perspective view of the assembly shown in FIGURE 1.

Figure 1:
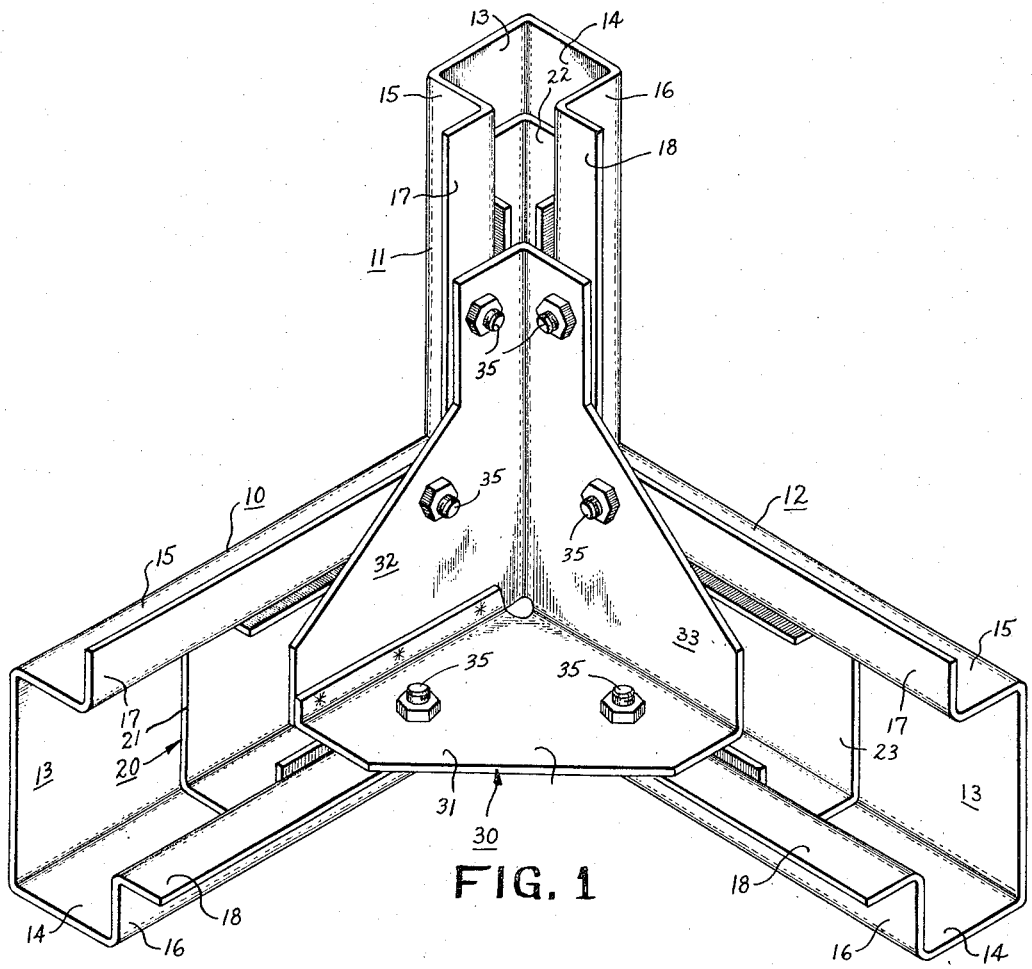
FIGURE 1 is a perspective view of a corner segment of a structural assembly constructed in accordance with the invention and showing the connection of three elongated mutually perpendicular structural members.

Referring to FIGURE 1, the invention is shown as included in a structural corner assembly comprising three elongated generally channel-shaped structural members 10, 11 and 12. Each of the structural members 10, 11 and 12 comprises two mutually perpendicular full side portions or side walls 13 and 14, and two parallel side walls 15 and 16 terminating in outwardly directed flange portions 17 and 18 respectively.

Referring particularly to FIGURE 4, a generally tripod-shaped reinforcing insert 20 is also provided, having three mutually perpendicular arm portions 21, 22 and 23. Each of the arm portions 21, 22 and 23 is formed generally similar to the structural members 10, 11 and 12 and includes a pair of full wall portions 24 and 25 and a pair of partial wall portions 26 and 27 which terminate as shown, preferably without flanges.

The arms 21, 22 and 23 of the reinforcing insert are received within the end portions of the structural members 10, 11 and 12 respectively as shown in FIGURE 1. As shown particularly in FIGURE 2, the side portions 26 and 27 of each of the arms 21, 22, 23 of the reinforcing insert are dimensioned to be slightly longer than the corresponding side portions 15 and 16 of the structural members 10, 11 and 12, so that the edge portions 26′, 27′ project slightly beyond the flanges 17 and 18.

A clamping plate or gusset 30 is also provided, which is generally corner-shaped and includes three generally triangular planar sections 31, 32, 33. The clamping plate or gusset 30 is also provided with holes 31′, 32′, and 33′ which, when the plate is inserted in the position shown in FIGURE 1, are aligned with holes 17′, and 18′ in the flange portion 17 and 18 of the structural members 10, 11 and 12. A plurality of suitable fastening means such as bolts 35 are inserted through these holes for the purpose of fastening the parts together.

Figures 2, 3:
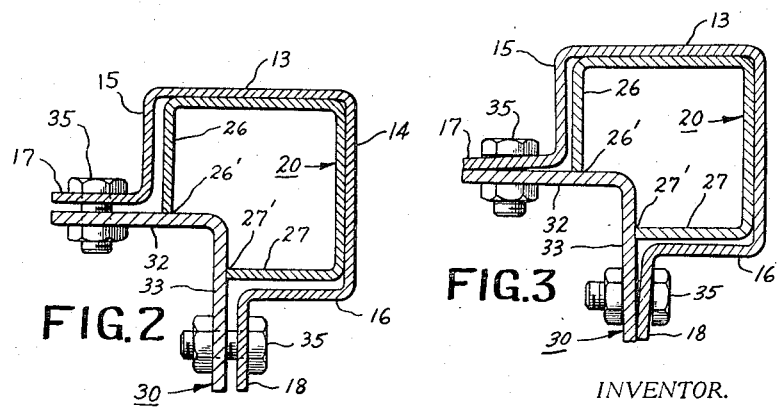
FIGURE 2 is a sectional view taken generally on the line 2—2 of FIGURE 1, the parts being shown in the condition which they assume immediately prior to tightening of the fastening means.
FIGURE 3 is a view similar to FIGURE 2 but showing the parts in the finally assembled condition, with the fastening means tightened.

In FIGURE 2, the parts are shown in the condition which they assume when first assembled. It will be observed that because of the dimensioning of the side portions 26, 27 of the reinforcing insert 20, there is a substantial clearance or space between the planar portions 31, 32, 33 of the gusset 30 and the corresponding flange portions 17 and 18 of the structural members 10, 11 and 12, the gusset member 30 at this time rests on the edge portions 26′, 27′ of the reinforcing insert 20.

When the bolts 35 are tightened, the parts are brought into the condition shown in FIGURE 3, in which the gusset member 30 is clamped against the flange portion 17. This tightening has the action of "wrapping" the structural members 10, 11 and 12 around the corresponding leg portions 21, 22, 23 of the reinforcing insert. In addition, the members 10, 11 and 12, and to some slight extent, the gusset 30 itself, all are slightly deformed or stressed, thereby creating an inherent resiliency in the parts which tightly holds all of the parts in assembled relation. In addition, this inherent resiliency resists any loosening of the bolts such as might occur due to vibration, etc.

While the invention has been described in connection with a corner comprising three mutually perpendicular members, it will be apparent that the construction may be used equally well to connect any two of the aforesaid members by simply omitting the third member and the portions of the reinforcing member and clamping member associated therewith. Accordingly, while the invention has been described in only one particular embodiment, it will be readily apparent that many modifications thereof may readily be made, and it is therefore intended by the appended claims to cover all such modifications as fall within the true spirit and scope of the invention.

What I claim as new and desired to secure by Letters Patent of the United States is:

1. A structural assembly comprising:
   (a) at least two elongated rigid structural members, each of said members comprising a generally channel-shaped member having a lengthwise extending opening and wall portions adjacent said opening terminating in flange portions extending generally perpendicular to said wall portions,
   (b) a reinforcing member comprising at least two angularly diverging arm portions, each of said arm portions being shaped to fit within an end portion of one of said structural members and including portions projecting through said opening of said structural member beyond said flange portions,
   (c) clamping means overlying said flanges of each of said structural members at said end portion thereof and spaced therefrom a small distance by said reinforcing member, and
   (d) means connecting said clamping means to said flanges of said structural members and trapping said reinforcing member therebetween.

2. A structural assembly comprising:
   (a) at least two elongated rigid structural members, each of said members comprising a generally rectangular tubular member, said rectangular tubular member comprising first and second full sides and third and fourth shortened sides defining an open channel, said third and fourth shortened sides terminating in flange portions extending substantially perpendicular to said shortened sides,
   (b) a reinforcing member comprising at least two angularly diverging arm portions, each of said arm portions being shaped to fit within an end portion of one of said structural members and including portions projecting through said opening of said structural member beyond said flange portions,
   (c) clamping means overlying said flanges of each of said structural members at said end portion thereof and spaced therefrom a small distance by said reinforcing member, and
   (d) means connecting said clamping means to said flanges of said structural members and trapping said reinforcing member therebetween.

3. A structural assembly comprising:
   (a) three elongated rigid structural members, each of said members comprising a generally channel-shaped member having a lengthwise extending opening and wall portions adjacent said opening terminating in flange portions extending generally perpendicular to said wall portions,
   (b) a reinforcing member comprising three angularly diverging arm portions, each of said arm portions being shaped to fit within at least an end portion of one of said structural members and including portions projecting through said opening of said structural member beyond said flange portions,
   (c) clamping means overlying said flanges of said structural members at at least said end portions thereof and spaced therefrom a small distance by said reinforcing member, and
   (d) means connecting said clamping means to said flanges of said structural members and trapping said reinforcing member therebetween.

4. A structural corner assembly as set forth in claim 3 wherein said clamping means comprises an integral metallic member having three generally triangular portions extending substantially perpendicular to each other.

5. A structural corner assembly comprising:
   (a) at least two elongated rigid structural members, each of said members comprising a generally rectangular tubular member having first and second full walls and third and fourth shortened walls defining an opening therebetween, said shortened walls terminating in outwardly directed flanges,
   (b) a reinforcing member comprising at least two angularly diverging arm portions, each comprising a generally rectangular tubular member having first and second full wall portions and third and fourth shortened wall portions, each of said arm portions being dimensioned to be received within an end portion of one of said structural members, said shortened wall portions of said reinforcing member extending slightly beyond said flanges of said structural members when said reinforcing member is within said structural member, said shortened wall portions including edges extending slightly beyond said flange portions,
   (c) a unitary clamping member including portions resting on said edges of said wall portions of each of said arm portions of said reinforcing member, and
   (d) fastening means connecting said clamping member to said flanges of each of said structural members with said reinforcing member clamped therebetween, said fastening means stressing said structural members and said clamping member to provide a resilient holding force resiliently pressing said arm of said reinforcing member against said full walls of said structural members.

References Cited

UNITED STATES PATENTS 2,167,525  7/1939  Rosendale _____ 287—189.36

FOREIGN PATENTS 229,470  7/1960  Australia.
371,570  8/1963  Switzerland.

DAVID J. WILLIAMOWSKY, *Primary Examiner.*

HARRISON R. MOSELEY, *Examiner.*

J. K. BELL, *Assistant Examiner.*